United States Patent Office 2,873,784
Patented Feb. 17, 1959

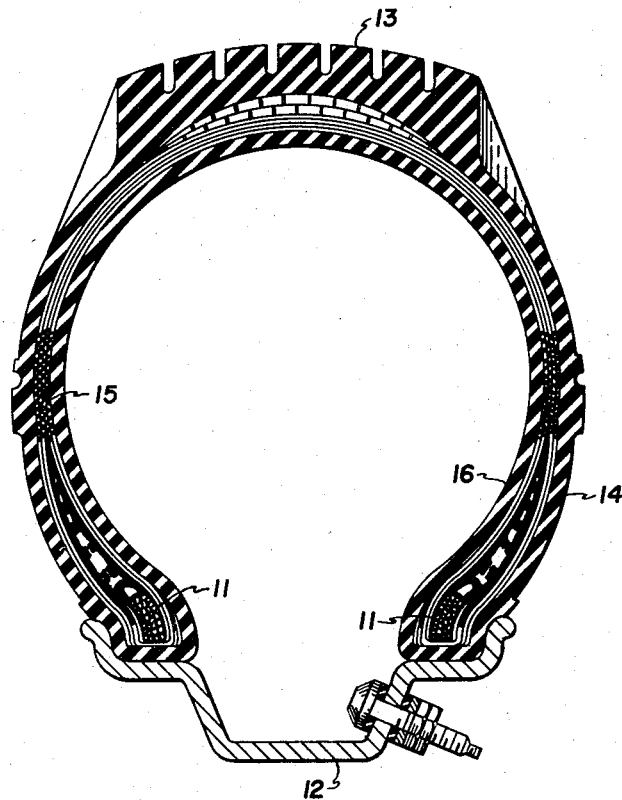

2,873,784

BUTYL RUBBER LIGHT COLORED VULCANIZATE, PROCESS OF PREPARING SAME, AND TIRE SIDEWALL MADE THEREFROM

Roger S. Hawley, Cranford, N. J., assignor to Esso Research and Engineering Company, a corporation of Delaware Application August 8, 1956, Serial No. 602,751

14 Claims. (Cl. 152—357)

This invention relates to light colored rubbery polymeric compositions of self-cleaning characteristics and of improved weathering and discoloring resistance. The present invention relates more particularly to vulcanizable and vulcanized rubbery copolymers of isoolefins and multiolefins in composition with certain proportions of calcium oxide and magnesium oxide wherein relatively large quantities of both calcium oxide and magnesium oxide are present.

When butyl rubber is combined with carbon black and cooled, the product exhibits exceptionally good weathering resistance. However, butyl rubber white vulcanizates have weathered badly, becoming tacky and discolored. In addition it has been difficult to buff butyl sidewalls. This has been a serious deterrent to the use of butyl rubber white sidewall tires. The automotive industry, as well as other industries, is also desirous of making light and pastel colored parts from butyl rubber, e. g. window and door weatherstripping, etc., that will look attractive and in harmony with the various painted parts and upholstery. It would also be desirable to make white and pastel shades of butyl rubber insulations, plug coverings, etc.

According to the present invention, it has been discovered that when butyl rubber is compounded with relatively large amounts of both calcium oxide and magnesium oxide, a vulcanizate may be formed having unusually high modulus of elasticity, while exhibiting good weathering, discoloration, crazing, cracking, and self-cleaning characteristics.

It has further been found that particularly good white vulcanizates are obtained when there is employed per 100 parts by weight of butyl rubber, about 15–80, preferably about 35–65 parts by weight of calcium oxide, and about 10–50, preferably 25–40 parts by weight of magnesium oxide. These proportions are advantageously combined with about 10–150 parts by weight of a white pigment, such as titanium dioxide, and about 5–80 parts by weight of a basic metal compound such as zinc oxide. Advantageous results are obtained if more calcium oxide than magnesium oxide is employed, e. g. about 1–5, preferably 1–3 parts of calcium oxide per part of magnesium oxide. In addition, the use of relatively large amounts of zinc oxide, e. g. 40–70 parts by weight, gives beneficial effects.

It has been found in the past that the use of either magnesium oxide or calcium oxide in the treatment of butyl rubbers will give products resistant to weathering, discoloration, crazing, and in the case of calcium oxide will give powdering desirable for self-cleaning. However, in accordance with the present invention, it has been discovered that the combination of both calcium oxide and magnesium oxide gives a vulcanizate of considerably higher elastic modulus than could be obtained by the use of calcium oxide or magnesium oxide individually. This unusual increase in modulus is achieved with no adverse effects upon the tensile strength. Vulcanizates of increased elastic modulus are particularly desirable in the manufacture of butyl white sidewall tires in order that they can be buffed, thereby giving cleaner white sidewalls.

Butyl rubber or GR–I rubber (Government Rubber-Isobutylene) as referred to in the prior art comprises the copolymerization product of a major proportion of a $C_4$–$C_8$ isoolefin and a $C_4$–$C_{14}$ multiolefin. Copolymers of the above general type, especially where the copolymer is of about 85 to 99.5% isobutylene, 2-methyl-1-butene or 3-methyl-1-butene, etc., with about 0.5 to 15% of a $C_4$ to $C_8$ conjugated diolefin such as isoprene, butadiene, dimethyl butadiene or such multiolefins as dimethallyl, allomethyl butadiene or such multiolefins as dimethallyl, allocimene, etc. are commonly referred to in patents and literature as "Butyl Rubber," e. g., textbook "Synthetic Rubber" by G. S. Whitby. The preparation of butyl type rubbers is described for example in U. S. Patent 2,356,128 to Thomas et al.; as well as in literature.

For the preparation of butyl rubber, a low molecular weight isoolefin, preferably isobutylene, is copolymerized with a conjugated diolefin, preferably isoprene, at relatively low temperatures, generally from about 0° C. to about −200° C. or lower, an advantageous range being from about −40° C. to about −160° C., preferably from about −80° C. to −100° C. The copolymerization is conducted in the presence of a Friedel-Crafts catalyst such as aluminum chloride, titanium tetrachloride, boron trifluoride, uranium chloride, aluminum ethoxy-chloride, etc. dissolved in an alkyl halide such as ethyl or methyl chloride, or dissolved in carbon disulfide or other solvent.

One particularly advantageous butyl rubber is produced with the preferred reactants being about 1–5 parts by weight of isoprene and about 99 to 95 parts by weight of isobutylene. The mixture of these reactants, diluted with about 3 volumes of methyl chloride, is cooled to a temperature within the range of about −50° C. to −150° C. and then polymerized by the addition thereto of a catalyst solution of an aluminum halide, such as aluminum chloride, in methyl chloride. The resulting copolymer preferably has a Staudinger molecular weight between about 25,000–1,000,000 and a Wijs iodine number of about 0.5 to 50. When so prepared, the material is rubbery in nature and has the property of being curable with sulfur especially in the presence of organic sulfides, particularly of the alkyl thiuram sulfide or thiocarbamate types.

In a preferred embodiment, the present invention comprises an improved vulcanized, rubbery, self-cleaning, white synthetic isoolefin-diolefin rubber composition which has been produced by the process which comprises heating in the presence of vulcanizing amounts of sulfur (preferably about 0.5 to 5.0 parts of sulfur) about 100 parts of a copolymer of about 95–99.5% isobutylene and about 0.5–5% isoprene, free of staining type anti-oxidants, about 25–75 parts by weight of calcium oxide, about 25 to 40 parts by weight of magnesium oxide, about 10–120 parts by weight of titanium dioxide, and about 5–70 parts by weight of zinc oxide and advantageously in the presence of about 0.5 to 2.0 parts by weight (preferably about 0.75 to 1.25 parts by weight) of non-staining ultra-accelerators such as an accelerator of the general formula:

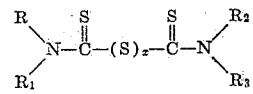

wherein R, $R_1$, $R_2$, and $R_3$ represent aliphatic hydrocarbon radicals, advantageously alkyl groups having about 1 to 5 carbon atoms (preferably 1 to 4 carbon atoms; e. g. tetra butyl thiuram disulfide) and $x$ represents an integer of about 1 to 5 and is preferably 2. Tetramethyl thiuram disulfide has been found to be a particularly advantageous accelerator.

Other less preferred non-staining accelerators include polyalkyl dithiocarbamates containing preferably about two alkyl groups of about 1 to 5 carbon atoms including such compounds as tellurium diethyl dithiocarbamate, zinc dimethyldithiocarbamate, etc. Also per 100 parts of polymer, there may be present about 0 to 5 parts (and preferably about 0.5 to 3.0 parts) by weight of stearic acid as a mold release agent, and about 0 to 5 parts (and advantageously 0.1 to 0.5 parts) of a conventional bluing agent such as Prussian blue or preferably ultramarine blue. A white synthetic rubber is thereby produced, which after vulcanization has a high modulus, and is self-cleaning, resistant to weathering and discoloring and suitable for the production of white sidewalls of premium grade automobile tires.

Vulcanization of the foregoing compositions according to the present invention may be conducted for about 5 minutes to about 2 hours (e. g. 10 to 60 minutes) at about 250° or 275° to 350° F. or for about 1 to 10 minutes at about 350° to 400° or 450° F. The higher the vulcanization temperature, the shorter may be the vulcanizing time and vice versa. The optimum vulcanization conditions include vulcanization times of about 5 to 60 minutes and temperatures of about 300° to 360° F. Insofar as the degree of fineness of the sulfur is concerned, the sulfur may pass through a 50 mesh to about a 500 mesh screen. However, a fineness of about 200 to 350 mesh or finer is preferable for the self-cleaning white rubbery compositions of the invention.

In another embodiment, self-cleaning pastel colored butyl rubber compositions as distinguished from white compositions may be prepared wherein the cure is effected in the presence of such materials as p-dinitrosobenzene, p-quinone dioxime, p-quinone dioxime dibenzoate, etc. and their various homologs and derivatives. Furthermore, for pastel colored butyl rubbers, the cure may be in the presence of such compositions as (1) sulfur and zinc dialkyl polythiocarbamate; (2) sulfur, lead oxide, and p-quinone dioxime; (3) sulfur, benzothiazyl disulfide and p-quinone dioxime; (4) p-quinone dioxime dibenzoate, lead oxide and sulfur, and (5) sodium and tellurium containing compositions such as tellurium diethyl dithiocarbamate, etc. However, to produce a white butyl rubber, the above compositions are less desirable than the preferred sulfur-polyalkylthiuramsulfide containing curing composition. To provide pastel colored butyl rubbers, the vulcanization of about 100 parts by weight of the butyl rubber is preferably accomplished by sulfur in the presence of a tetra alkyl thiuram sulfide or a dithiocarbamate and also in the presence of about 10 to 100 parts by weight of calcium oxide and about 10 to 50 parts by weight of magnesium oxide as well as titanium dioxide and zinc oxide. The desired color is then obtained by adding an additional pigment or pigments to the composition as desired.

Pigments suitable for pastel butyl rubbers when employed in minor quantities but generally less satisfactory for white butyl rubber compositions are as follows: lead oxide, lead carbonate, barytes, lead sulphate, cadmium lead, calcium carbonate, ferric hydroxide, lead iron oxide, chrome-yellow lead chromate, Prussian blue, phthalocyanine, etc. Inorganic pigments are generally preferred and are employed either alone or in combination with organic pigments according to the color desired. For pastel colored rubbers as distinguished from white rubbers, the white colored representatives of the above pigments or their equivalents may in some cases replace at least a minor portion of the titanium dioxide.

The compositions of the invention which have been cured give higher modulus vulcanizates, which have improved elastic limits, tensile strengths, abrasion resistance and flexure resistance. Also, the mixtures before curing may be compounded with various fillers, plasticizers, and anti-oxidants, etc. For example, generally small amounts of conventional non-staining anti-oxidants or even slightly colored anti-oxidants such as phenyl beta naphthylamine may be employed. The non-staining anti-oxidants which are particularly efficacious for white butyl rubber comprise about 0.1 to 2.0%, advantageously 0.2 to 1.0% and preferably about 0.25% to 0.50% of either alkylated aromatic hydrocarbons or alkylated heterocyclics and include especially the following:

I.

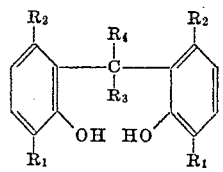

wherein the above anti-oxidant represents an alkylated bisphenol where $R_1$ is a tertiary alkyl group of 3 to 5 carbon atoms and is preferably a tertiary butyl group, $R_2$ represents a $C_1$ to $C_8$ alkyl group (preferably ethyl or methyl) and $R_3$ and $R_4$ represent hydrogen or a $C_1$ to $C_5$ alkyl group. A representative compound is bis(2-hydroxy-3-tertiary butyl-5-methyl phenyl) methane.

II.

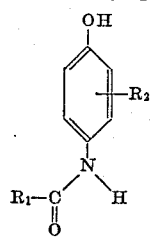

wherein R represents a $C_1$ to $C_{14}$ alkyl group (preferably a $C_8$ or $C_{14}$ alkyl group) and $R_2$ represents an alkyl group of from 0–18 carbon atoms. A representative compound is lauroyl p-aminophenol.

III. A $C_5$ to $C_9$ alkylated diphenylamine such as heptylated diphenylamine.

The present invention will be best understood from a consideration of the following experimental data.

EXAMPLE I

Two different types of commercial butyl rubbers, butyl rubber A and butyl rubber B were employed in the experimental data presented below. The rubbers had the following characteristics:

| | Mooney viscosity (212° F. for 8 minutes) | Mole percent unsat. (drastic iodine method) | Viscosity, average mol. wt. |
|---|---|---|---|
| Butyl rubber A | 71–79 | 1.5–1.6 | 380,000–420,000 |
| Butyl rubber B | 41–49 | 2.0–2.2 | 325,000–340,000 |

Butyl rubber A was compounded with various amounts of CaO and MgO as shown in Table I. In addition 2 parts by weight of sulfur, 0.2 part by weight of ultramarine blue and 1.25 parts by weight of tetramethyl thiuram disulfide were added, and the compositions were mixed on a cold mill. They were then shaped and vulcanized in a press for 45 minutes at 307° F., and their physical properties determined as tabulated below:

Table 1

| | Run 1 | Run 2 | Run 3 |
|---|---|---|---|
| Materials, parts by weight: | | | |
| Butyl rubber A | 100 | 100 | 100 |
| TiO$_2$ | 100 | 100 | 100 |
| Stearic acid | 1 | 1 | 1 |
| ZnO | 10 | 10 | 10 |
| MgO | 50 | | 25 |
| CaO | | 50 | 25 |
| Properties: | | | |
| Tensile strength (p. s. i.) | 1,463 | 1,241 | 1,500 |
| Elongation (percent) | 653 | 647 | 653 |
| Modulus (p. s. i.) at— | | | |
| 200% extension | 250 | 250 | 300 |
| 300% extension | 325 | 350 | 475 |
| Hardness, Shore | 63 | 48 | 50 |

As seen from the above data, the use of both MgO and CaO in the compounding of the butyl rubber gives a product of surprisingly high modulus, while exhibiting good tensile strength, elongation and hardness. The modulus of the vulcanizate formed by compounding with both MgO and CaO is considerably greater, particularly at 300% extension, than was shown by products embodying equal weights of either MgO or CaO individually.

EXAMPLE II

The same butyl rubber as in Example I in the presence of 2 parts by weight of sulfur, 0.2 part by weight of ultramarine blue and 1.25 parts by weight of tetramethyl thiuram disulfide was compounded as shown in Table II. After curing for 45 minutes at 307° F., the vulcanizates were found to have the properties tabulated below:

Table II

|  | Run 3 | Run 4 | Run 5 |
|---|---|---|---|
| Materials: |  |  |  |
| Butyl rubber A | 100 | 100 | 100 |
| TiO$_2$ | 30.0 | 30.0 | 30.0 |
| Talc (U. S. P.) | 70.0 | 70.0 | 70.0 |
| Anti-oxidant N-lauroyl-p-aminophenol | 2.0 | 2.0 | 2.0 |
| MgO | 37.5 | 37.5 | 25.0 |
| CaO | 37.5 | 37.5 | 50.0 |
| ZnO | 10 | 60.0 | 10.0 |
| Properties: |  |  |  |
| Tensile strength (p. s. i.) | 1,180 | 1,150 | 1,010 |
| Elongation, percent | 520 | 504 | 560 |
| Modulus (p. s. i.) at— |  |  |  |
| 200% extension | 625 | 650 | 500 |
| 300% extension | 775 | 810 | 600 |
| Hardness, Shore | 68 | 71 | 65 |

The above results, particularly when compared with the 300% modulus of 325–350 of runs 1 and 2 of Example I, demonstrate the high modulus values (600–810) obtained by the use of both MgO and CaO. It should be noted that good characteristics of tensile strength, elongation and hardness are simultaneously achieved. As shown in run 4, increasing the amount of ZNO gave a product of exceptionally good modulus.

EXAMPLE III

Butyl rubber B was compounded with the materials as shown in Table III. In addition, 0.2 part by weight of ultramarine blue, 2.0 parts by weight of sulfur and 1.25 parts by weight of tetramethyl thiuram disulfide were employed in each composition.

The compositions were cured in a press for 45 minutes at 307° F., and vulcanizates of the following properties were produced:

Table III

|  | Run 6 | Run 7 |
|---|---|---|
| Materials: |  |  |
| Butyl rubber B | 100 | 100 |
| Stearic acid | 1 | 1 |
| TiO$_2$ | 100 | 100 |
| ZnO | 10 | 10 |
| MgO |  | 25 |
| CaO | 50 | 25 |
| Properties: |  |  |
| Tensile strength | 1,075 | 1,250 |
| Elongation, percent | 692 | 696 |
| Modulus (p. s. i.) at— |  |  |
| 200% elongation | 200 | 300 |
| 300% elongation | 270 | 400 |
| Hardness, Shore | 50 | 53 |

The above runs in Table III demonstrate that the use of a combination of both MgO and CaO gives a more desirable product. In particular, the modulus of said product is considerably greater than that obtained by employing an equal weight of CaO alone. The results show that in addition the composition embodying the improvement of the invention shows as good or better other physical properties as the product obtained solely by using CaO.

EXAMPLE IV

Butyl rubber B was compounded as shown. Sulfur, tetramethyl thiuram disulfide and ultramarine blue were added as in Example III.

After curing in a press for 45 minutes at 307° F., vulcanizates of the following properties were obtained:

Table IV

|  | Run 8 | Run 9 | Run 10 |
|---|---|---|---|
| Materials: |  |  |  |
| Butyl rubber B | 100 | 100 | 100 |
| Stearic acid | 1 | 1 | 1 |
| TiO$_2$ | 30 | 30 | 30 |
| Talc | 70 | 70 | 70 |
| ZnO | 10 | 10 | 10 |
| MgO | 50 |  | 37.5 |
| CaO |  | 75 | 37.5 |
| Properties: |  |  |  |
| Elongation, percent | 620 | 524 | 543 |
| Modulus (p. s. i.) at— |  |  |  |
| 200% extension | 400 | 500 | 575 |
| 300% extension | 500 | 575 | 700 |
| Hardness, Shore | 70 | 66 | 70 |

The above results demonstrate that a butyl rubber composition prepared in accordance with the present invention shows considerably better modulus properties at both 200% and 300% extension than vulcanizates prepared by the use of equivalent amounts of either MgO or CaO individually.

EXAMPLE V

The butyl rubber of Example III, composited with sulfur, tetramethyl thiuram disulfide and ultramarine blue as in Example III, was compounded as tabulated, and after curing at 307° F. for 45 minutes exhibited the following characteristics:

Table V

|  | Run 11 | Run 12 | Run 13 | Run 14 |
|---|---|---|---|---|
| Materials: |  |  |  |  |
| Butyl rubber B | 100 | 100 | 100 | 100 |
| TiO$_2$ | 30 | 30 | 30 | 30 |
| Talc | 70 | 70 | 70 | 70 |
| ZnO | 10 | 10 | 10 | 10 |
| MgO | 37.5 | 37.5 | 25 | 12.5 |
| CaO | 37.5 | 37.5 | 50 | 62.5 |
| Anti-oxidant, N-lauroyl-p-aminophenol | 2.0 |  |  |  |
| Anti-oxidant, dicyclo hexylamine stearate |  | 2.0 | 2.0 | 2.0 |
| Properties: |  |  |  |  |
| Tensile strength (p. s. i.) | 1,080 | 1,100 | 1,100 | 935 |
| Elongation, percent | 565 | 556 | 526 | 508 |
| Modulus (p. s. i.) at— |  |  |  |  |
| 200% elongation | 560 | 570 | 650 | 560 |
| 300% elongation | 650 | 650 | 750 | 650 |
| Hardness, Shore | 68 | 68 | 68 | 67 |

The results demonstrate that vulcanizates of exceptional properties are obtained in accordance with the present invention. The 2:1 ratio of CaO:MgO gave the highest modulus.

It is preferable to use a combination of about 25 to 40 parts by weight of magnesium oxide and about 25 to 65 parts by weight of calcium oxide.

EXAMPLE VI

Butyl rubber B together with quantities of sulfur, tetramethyl thiuram disulfide, ultramarine blue as in Example III were combined with both MgO and CaO and varying quantities of ZnO as shown. After vulcanization as described in previous samples, products of the following properties were obtained.

Table VI

| | Run 15 | Run 16 | Run 17 |
|---|---|---|---|
| Materials: | | | |
| Butyl rubber B | 100 | 100 | 100 |
| TiO₂ | 30 | 30 | 30 |
| Talc | 70 | 70 | 70 |
| MgO | 37.5 | 37.5 | 37.5 |
| CaO | 62.5 | 37.5 | 37.5 |
| ZnO | 10 | 60 | 60 |
| N-lauroyl-p-aminophenol | | 2.0 | |
| Dicyclohexylamine stearate | 2.0 | | 2.0 |
| Properties: | | | |
| Tensile strength (p. s. i.) | 1,000 | 1,150 | 1,150 |
| Elongation, percent | 450 | 522 | 526 |
| Modulus (p. s. i.) at— | | | |
| 200% elongation | 745 | 700 | 675 |
| 300% elongation | 850 | 825 | 800 |
| Hardness, Shore | 73 | 71 | 71 |

Products of exceptional modulus characteristics were produced. Comparison of runs 16 and 17 with results of Examples V and VI shows that high concentration of ZnO, in addition to the use of both the MgO and CaO, gave better vulcanizates.

Referring now to the drawing, the pneumatic tubeless tire shown comprises a hollow torodial type member which is substantially U-shaped in cross-section by virtue of an open portion which extends around the inner periphery of the member. In other words, the member is of a tubular type structure which has a cross-section in the form of an open-bellied body with spaced terminal portions to define a member generally resembling a horseshoe, wherein the open portion of the horseshoe-shaped-member faces toward the interior circumference of said member. The terminal portions constitute the bead portions 11—11 of the tire, inside of which are a plurality of bead wires adhesively embedded and molded in a rubber. The outer surface of the bead portion is advantageously formed into an air sealing means such as a built-up rubber layer or plurality of ribs to aid in adhesion to rim 12 when the tire is inflated. Alternatively, the tire rim 12 may be ribbed if the outer surface of the bead portions are smooth. The remaining outer surface of the tire also includes tread area 13 and sidewalls 14. The remaining construction of the tire may vary according to conventional fabrication but in general the tire is a multi-layered type of structure with an outer layer as above-mentioned. The layer next adjacent the outer layer generally comprises a carcass 15 which includes a rubber such as butyl rubber which has incorporated therein a fabric composed of a plurality of cotton, rayon, or nylon cords, etc. The tire also includes an inner lining 16, advantageously made from butyl rubber which must be substantially impermeable to air. This lining may be at least partially vulcanized at least at about 200–350° F. with from about 0.2–10.0 weight percent sulfur based on the weight of the copolymer. The above multi-layers, at least three in number, are conventionally bonded or otherwise adhered together; for example, by vulcanization to form a tire of a unitary structure.

The light colored butyl rubber compositions of the present invention are employed as the sidewall for the rubber tire and are either white or pastel colored. They are likewise conventionally bonded or otherwise adhered (especially by vulcanization) to the tire to form a unitary structure. In such a case, the tubeless tire would comprise a casing of an outer layer including a tread, sidewall, and outer bead portions, etc. wherein the sidewall comprises a rubbery copolymer of a major proportion of an isoolefin and a minor proportion of a multi-olefin, combined with both calcium oxide and magnesium oxide, titanium dioxide and zinc oxide in amounts according to the present invention.

While the foregoing disclosure has related to tubeless tires, the novel butyl rubber compositions of the present invention may be likewise employed in conventional inner-tube containing tires, and in other applications as previously mentioned, while remaining within the spirit of the invention and the scope of the appended claims.

What is claimed is:

1. A composition comprising about 100 parts of a rubbery copolymer of a major proportion of an isoolefin and a minor proportion of a multiolefin, and a combination of about 10 to 80 parts of calcium oxide and about 10 to 50 parts of magnesium oxide, to increase the elastic modulus of the composition upon vulcanization.

2. A rubbery polymeric composition of claim 1, wherein the composition contains about 5 to 80 parts of zinc oxide.

3. A rubbery polymeric composition of claim 1, wherein the composition contains about 30 to 100 parts of titanium dioxide.

4. A vulcanizable rubbery polymeric composition of improved elastic modulus comprising about 100 parts by weight of a copolymer of major proportions of isobutylene and a minor proportion of a conjugated diolefin and about 10 to 50 parts by weight of magnesium oxide, about 10 to 80 parts by weight of calcium oxide, and about 5 to 80 parts by weight of zinc oxide.

5. Vulcanizable composition comprising about 100 parts by weight of a copolymer of about 95 to 99.5% isobutylene and about 0.5 to 5.0% isoprene, about 25 to 40 parts by weight of magnesium oxide, about 35 to 65 parts by weight of calcium oxide, about 30 to 100 parts by weight of titanium oxide and about 10 to 70 parts by weight of zinc oxide.

6. A rubbery vulcanized composition comprising essentially per 100 parts by weight of a copolymer of about 95 to 99.5% isobutylene and about 0.5 to 5.0% isoprene, about 25 to 40 parts by weight of magnesium oxide, about 35 to 65 parts by weight of calcium oxide, about 10 to 120 parts by weight of titanium dioxide, about 10 to 70 parts by weight of zinc oxide, about 1 to 3 parts by weight of sulfur, and about 0.5 to 2.0 parts by weight of vulcanization accelerator.

7. Composition according to claim 6 wherein said composition contains an anti-oxidant present in amounts of 0.5 to 3.0 parts by weight.

8. Composition according to claim 6, having a 300% modulus value of at least 400.

9. Composition according to claim 6 wherein said composition contains talc in amounts of 10 to 120 by weight.

10. A process for making vulcanized rubbery compositions of improved elastic modulus which comprises heating at about 275° to 400° F. in the presence of a vulcanizing agent, about 100 parts by weight of a copolymer of a major proportion of an isoolefin of about 4 to 8 carbon atoms and a minor proportion of a multiolefin of about 4 to 14 carbon atoms, and about 10 to 50 parts by weight of magnesium oxide, about 10 to 80 parts by weight of calcium oxide, about 10 to 120 parts by weight of titanium dioxide, and about 5 to 80 parts by weight of zinc oxide for a sufficient time to vulcanize the composition.

11. Process according to claim 10 wherein the magnesium oxide is present in an amount of 25 to 40 parts by weight, the calcium oxide is present in an amount of about 35 to 65 parts by weight, the titanium dioxide is present in an amount of about 30 to 100 parts by weight, and the zinc oxide is present in an amount of 10 to 70 parts by weight.

12. An automobile tire which contains as a sidewall thereof a composition comprising a rubbery copolymer of about 100 parts of a major proportion of an isoolefin and a minor proportion of a multiolefin, and a combination of about 10 to 80 parts of calcium oxide and about 10 to 50 parts of magnesium oxide, to increase the elastic modulus.

13. An automobile tire as in claim 12 wherein the composition of the sidewall contains titanium dioxide and zinc oxide.

14. A sidewall suitable for application to automobile tires comprising 100 parts by weight of a rubbery copolymer of a major proportion of an isoolefin and a minor proportion of a multiolefin, about 10 to 50 parts by weight of magnesium oxide, about 10 to 80 parts by weight of calcium oxide, about 10 to 120 parts by weight of titanium dioxide, and about 5 to 80 parts by weight of zinc oxide.

References Cited in the file of this patent

UNITED STATES PATENTS 2,731,060   Rowe _____ Jan. 17, 1956

OTHER REFERENCES

The Vanderbilt Rubber Handbook, R. T. Vanderbilt Co. (N. Y.), 9th edition, 1948, page 216.